United States Patent [19]

Opfer

[11] 4,298,834
[45] Nov. 3, 1981

[54] POWER DISSIPATION REGULATING CIRCUIT FOR INDUCTION MOTOR BY SUPPLY VOLTAGE CONTROL IN FUNCTION OF PHASE ANGLE

[76] Inventor: Gerald D. Opfer, 8724 Via Diego Ct., Lakeside, Calif. 92040

[21] Appl. No.: 198,201

[22] Filed: Oct. 17, 1980

[51] Int. Cl.³ .............................................. H02P 7/62
[52] U.S. Cl. ..................................... 318/729; 318/806
[58] Field of Search .......................... 323/205, 242–244, 323/246; 318/729, 778, 798, 806, 810; 307/234

[56] References Cited

U.S. PATENT DOCUMENTS

| | | | |
|---|---|---|---|
| 3,246,247 | 4/1966 | Grindle | 307/234 |
| 3,443,188 | 5/1969 | Mortimer | 323/242 |
| 4,052,648 | 10/1977 | Nola | 318/810 |
| 4,266,177 | 5/1981 | Nola | 318/310 |
| 4,271,386 | 6/1981 | Lee | 318/729 |

OTHER PUBLICATIONS

NASA Study, "Power Factor Controller", Brief No. MFS-23280, Apr. 2, 1979.

Primary Examiner—William H. Beha, Jr.
Attorney, Agent, or Firm—Henri J. A. Charmasson

[57] ABSTRACT

An energy-saving device in the controlof an induction motor which keeps the power factor to a desirable value, regardless of load and line voltage variations, by switching off the voltage applied to the motor during each cycle for a period of time in response to the phase lag between current and voltage. An automatic timing circuit provides for the application of maximum power during motor starting and quick response upon sudden changes in load conditions.

7 Claims, 3 Drawing Figures

POWER DISSIPATION REGULATING CIRCUIT FOR INDUCTION MOTOR BY SUPPLY VOLTAGE CONTROL IN FUNCTION OF PHASE ANGLE

BACKGROUND OF THE INVENTION

This invention relates to the control of the power applied to a motor and more specifically to the variation of input power to an AC induction motor in function of the loading conditions.

An induction motor runs most efficiently when it is fully loaded, that is, when the counter-electromotive force developed between the fields and the armature is almost equal to the power supplied to the motor. When the load is reduced without reducing applied voltage or when the applied voltage is raised without increase in load, the current remains relatively high, causing internal heat losses. Typically, the no-load current of a single-phase motor can reach 90% of the rated load current. In three-phase motors the no-load current is approximately 50%–60% of the rated load current. The current lag between voltage and current tends to increase from 30° at full load condition to 80° in an unloaded motor. Large users of motors with cyclic loads are often penalized by the utility companies for their low power factor.

The most practical way to control the power factor of an induction motor which is subject to wide variations in load or line voltage is to reduce the voltage applied to the motor every time the phase lag between the voltage and current exceeds a predetermined, desirable value.

PRIOR ART

A power factor control system for AC induction motors is disclosed in U.S. Pat. No. 4,052,648, Nola. An improved version of the Nola design is disclosed in the National Aeronautical and Space Administration Technical Brief No. MFS-23280 entitled Power Factor Controller.

SUMMARY OF THE INVENTION

The instant invention offers a substantial improvement over the prior art in various areas. To begin with, the invention offers simplified circuitry which uses inexpensive comparator devices instead of the operational amplifiers used throughout the prior art. Consequently, the requirements for the power supply are less stringent, yielding a reduction in the numbers of components from 13 to 5 for the power supply circuit alone.

More significantly, the invention features a time correction circuit which provides for full application of maximum power to the motor during the starting period and a quick response in the power factor correction upon sudden changes in the motor loading. This is achieved by varying the duty cycle of the motor in response to an error signal which is generated by integrating a train of pulses the width of which is proportional to the phase lag, but from which has been subtracted a time period predetermined in function of the desired power factor.

DESCRIPTION OF THE PREFERRED EMBODIMENT OF THE INVENTION

Figure 1:
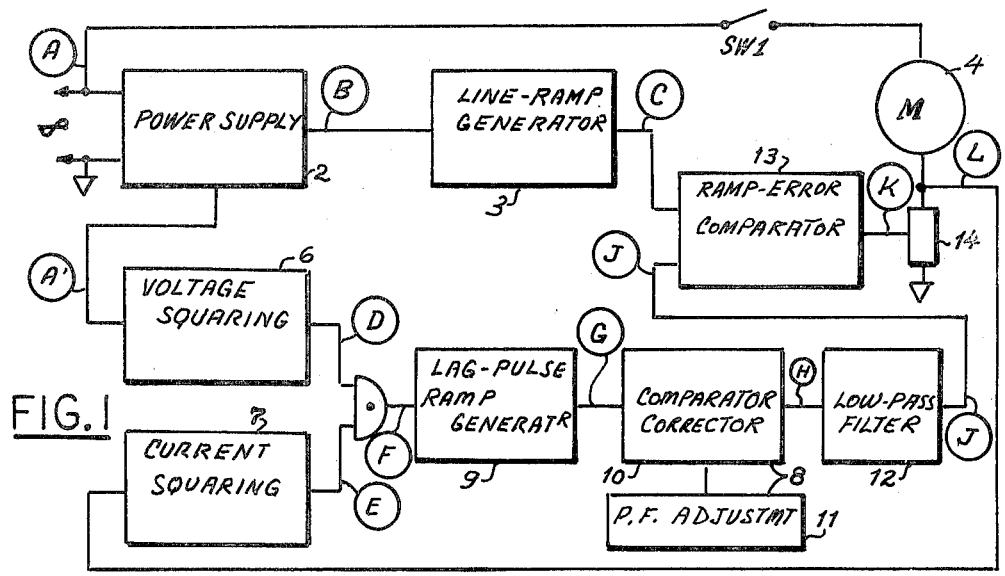
FIG. 1 is the block diagram of the preferred embodiment of the invention.

Referring now to the drawing, and as shown in the block diagram of FIG. 1, the main difference between the preferred embodiment of the invention applied to a single phase motor as compared to the teachings of the prior art includes the use of a novel lag-pulse timing correction circuit 8 in lieu of a summing amplifier. Other significant improvements will become evident in the detailed description of the schematic of FIG. 2.

Basically, the power factor of the AC induction motor 4 is regulated by reducing the voltage duty cycle applied to the motor in function of the phase lag between the applied voltage, illustrated in waveform A, and the current, illustrated in waveform L, drawn by the motor 4. This phase lag is represented by a pulse, illustrated as waveform F. The lag-pulse F is obtained by ANDing the squared voltage and current signals. After being processed through the lag-pulse timing correction circuit 8, the train of lag-pulses H are integrated through a low-pass filter 12 to form a voltage level signal J which is representative of the corrected phase lag. This voltage level is compared to a ramp signal C triggered every time the line voltage changes polarity. The ramp & error voltage comparator 13 generates a firing pulse illustrated as waveform K, the leading edge of which occurs when the ramp signal C reaches the voltage level J, and the trailing edge coincides with the zero crossing of the line voltage. The firing pulse K is applied to a Triac 14 mounted in series with the motor 4. Consequently, the duty cycle of the Triac 14 is reduced as the phase lag voltage level J increases. The Triac operates in such a way that the motor current is blocked in either direction until the firing pulse K is applied to its gate, at which point it will conduct in either direction until the motor current goes through zero. It can now be understood that as the loading of the motor is reduced and the phase lag between the voltage applied to the motor and the current drawn by its increases, the duty cycle of the Triac 14 is reduced, causing a drop in the amount of power supplied to the motor. This results in an automatic correction of the power factor.

Figure 3:
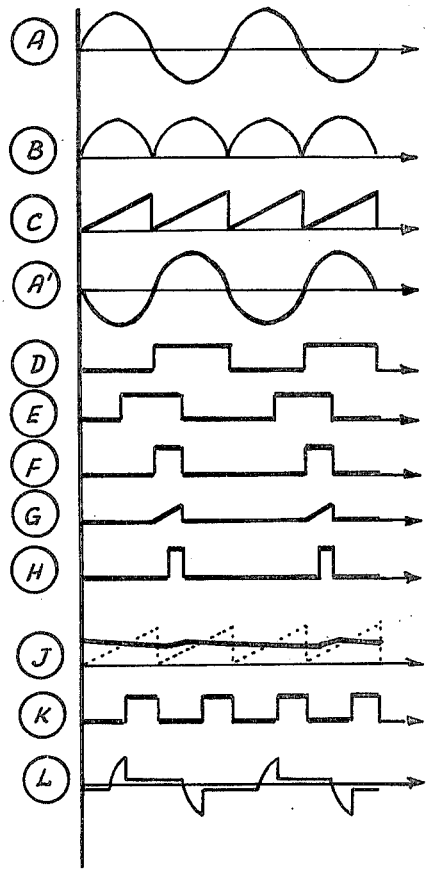
FIG. 3 illustrates various signal waveforms throughout the circuit. These waveforms show time relationship only. Their amplitudes are not to scale.
Figure 2:
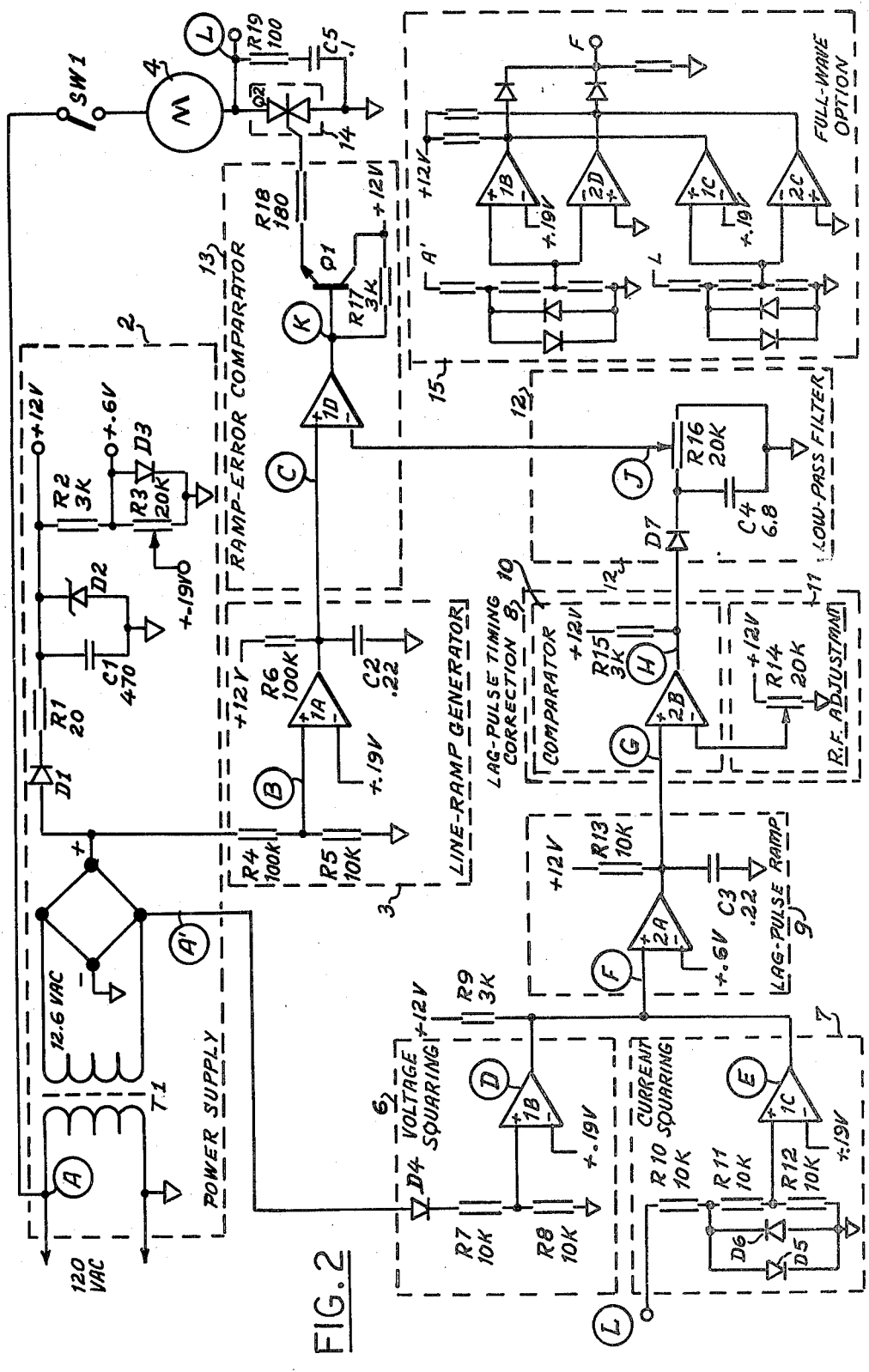
FIG. 2 is an electrical schematic thereof.

Referring now to FIGS. 2 and 3, the detailed operation of the circuit will be explained.

The line voltage is applied to the primary of transformer T-1. The output from the secondary of T-1 is bridge-rectified and passed through blocking diode D-1, filtered and regulated by resistor R1, capacitor C1 and zener diode D2. The resulting 12-volt DC supply voltage is applied to the voltage divider R2, R3 and diode D3 in order to generate bias voltages used throughout the circuit.

The full-wave-rectified signal B derived from the output of the bridge is applied to the input of the squaring comparator 1A. The RC network R6, C2 at the output of comparator 1A has a time constant which is comparatively much longer than the duration of the half cycle period of the rectified signal B. Consequently, the signal C at the output of comparator 1A is a nearly linear voltage ramp which is triggered every time the line voltage crosses zero.

The secondary of transformer T1 produces a sinusoidal signal A' that is 180° out of phase with the line voltage illustrated by waveform A. This signal is half-wave-rectified through diode D4 as illustrated in waveform D. This signal is applied to the input of squaring comparator 1B.

The current drawn by the motor 4 is sensed at the junction of the motor 4 and the Triac Q2, and is illustrated in waveform L. This current-indicating signal is divided down through R10, R11, R12 and limiting diodes D5 and D6. The resulting signal E is applied to the squaring comparator 1C. The collectors of squaring comparators 1B and 1C share the common load R9. Since the comparators are non-inverting, the resulting signal F is equivalent to the ANDing of the squared D and E waveforms. Consequently, signal F is a pulse, the width of which corresponds to the phase lag between the voltage applied to the motor and the current drawn by the motor.

The lag-phase F is used to generate a ramp-voltage G by applying it to a network formed by comparator 2A, resistor R13 and capacitor C3 which operates in a manner similar to the ramp voltage generator 3 to produce a ramp voltage which is triggered with the leading edge of the lag pulse F. The lag-pulse ramp G is compared to an adjustable voltage level derived from the power factor adjustment potentiometer R14. Accordingly, the output of the comparator 2B is a narrowed pulse, the leading edge of which corresponds to the time when the lag-pulse ramp signal G reaches the threshhold level established by potentiometer R14.

The corrected lag-pulse H is transformed into an error voltage level J through the low pass or integrating circuit formed by diode D7, capacitor C4 and potentiometer R16.

The error signal J is used as a bias on the comparator 1D which compares to it the line-ramp signal C. When the line-ramp signal C reaches the level of the error voltage level J, the comparator 1D generates a firing pulse K which is applied to the gate of the Triac through driver Q1. The "snubber network" constituted by R19 and C5 is a manufacturer-recommended circuit designed to prevent loss of Triac gate control when peak current is being drawn through Q2.

The advantage of the lag pulse timing correction circuit 8 which includes the lag-pulse-ramp generator 9 and the comparator-and-corrector circuit 10 can best be explained by a description of the device operation under various loading conditions of the motor 4.

Let us first analyze the operation of the circuit when the motor 4 is started having a full load applied to it.

While the on/off switch SW1 is open and the line voltage is applied to the power supply, there is no current flowing through the motor 4, therefore the current signal L is zero and no lag pulse is generated. The lag pulse timing correction circuit 8 is inoperative regardless of the setting of the power factor adjustment 11. The error voltage level J is at its minimum value and the firing pulse K applies the maximum duty cycle control to the Triac Q2. When switch SW1 is closed the Triac Q2 is fully conductive and the maximum power is applied to the motor 4. This full application of power during a loaded start of the motor 4 is an absolute requirement since the motor is working at its maximum efficiency during that phase of operation. By contrast, the permanent bias established by the power factor adjustment disclosed in the prior art tends to impose a reduction of applied power during that critical phase of operation. In the present invention, the effect of the lag-pulse-timing-correction circuit which establishes a minimum desirable duty cycle, does not become active until some phase lag in excess of the desirable minimum phase lag is actually detected by the circuit. This condition does not occur until the motor load is reduced.

Let us assume, now, that the motor 4 is started in an unloaded condition. As in the previous case, the Triac is fully conductive when the switch SW1 is closed, a phase lag between the voltage and current will be quickly detected by the lag pulse generator circuit 5. However, the effect of the excessive phase lag will be reduced by the lag pulse timing correction circuit 8 in accordance with the setting of the power factor adjustment 11 until the motor reaches the desired efficiency corresponding to that setting.

The two extreme working conditions which have just been described illustrate the versatility of the circuit and its improved response to changes in working conditions of the motor without burdening the device with such networks as the "sudden load" and "starting override" circuits recommended in the prior art. It should be noted that the improvement in the operation of the device has been achieved while not only reducing the number of components necessary, but also by selecting components of less complexity and generally lower cost.

A further improvement in the response time of the circuit can be achieved by doubling the number of lag-pulses, using a full wave rectification of the voltage and current signals as illustrated in block 15 of FIG. 2 without significant increase in the component count.

While I have described the preferred embodiment of the invention, modifications can be made thereto without departing from the spirit of the invention and the scope of the appended claims.

I claim:

1. In a device for maintaining the power factor of an induction motor to a desirable value regardless of load and line voltage variations by switching off the voltage applied to the motor during each cycle for a period of time in function of an error signal, a circuit for generating said error signal in response to the phase lag between the applied voltage and the current drawn by the motor which comprises:

means for generating a train of pulses having a width proportional to said phase lag;

means for reducing said width by a predetermined period wherein said means for reducing comprises for each pulse:

means for generating a ramp voltage beginning with the leading edge of said pulse;

means for the delaying said leading edge until said ramp voltage reaches a predetermined voltage value corresponding to said predetermined period; and means for developing a voltage level proportional to the reduced width of said pulses.

2. The circuit of claim 1 wherein said predetermined value is a function of the desirable power factor.

3. The circuit claimed in claim 2 wherein said means for generating a train of pulses comprise:

means for sensing the current drawn by the motor;

means for generating a first square-wave signal in phase with the waveform of said current;

means for generating a second square-wave signal having a phase opposite to the phase of the voltage applied to the motor; and means for ANDing said first and second square-wave signals during at least one common polarity excursion.

4. The circuit claimed in claim 3 wherein said means for ANDing comprise two voltage comparators, one of said comparators receiving said first square-wave signal on one of its inputs and the other comparator receiving said second square-wave signal on one of its inputs, and the outputs of said voltage comparators sharing a common collector load.

5. The circuit in claim 2 or claim 4 wherein said means for delaying comprise:
adjustable means for generating said predetermined voltage value; and
a voltage comparator receiving on one of its inputs said predetermined voltage value and on another one of its inputs said ramp voltage.

6. The circuit claimed in claim 5 which further comprises:

means, responsive to the output of said means for delaying, for developing a corrected-phase-error signal;
means for generating a ramp waveform synchronized with each half-cycle of the voltage applied to the motor;
means for continuously comparing the instantaneous level of said ramp waveform to the level of said corrected-phase-error signal; and
means, responsive to the output of said means for comparing, for cyclicly switching the voltage applied to the motor.

7. The circuit claimed in claim 5 wherein said means for developing a corrected-phase-error comprise a diode forward-connected to the active terminal of a grounded capacitor, said capacitor having in parallel therewith a discharge resistor.

* * * * *